United States Patent
McCoy et al.

(10) Patent No.: US 9,577,463 B2
(45) Date of Patent: Feb. 21, 2017

(54) PORTABLE DEVICE TO PORTABLE DEVICE WIRELESS POWER TRANSFER METHODS AND SYSTEMS

(71) Applicants: Sony Corporation, Tokyo (JP); Sony Network Entertainment International LLC, Los Angeles, CA (US)

(72) Inventors: Charles McCoy, Coronado, CA (US); James R. Milne, Ramona, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 189 days.

(21) Appl. No.: 14/290,409

(22) Filed: May 29, 2014

(65) Prior Publication Data
US 2015/0349572 A1    Dec. 3, 2015

(51) Int. Cl.
*H02J 7/00*     (2006.01)
*H02J 7/02*     (2016.01)

(52) U.S. Cl.
CPC .............. *H02J 7/025* (2013.01); *H02J 7/0054* (2013.01); *H02J 50/10* (2016.02); *H02J 50/20* (2016.02)

(58) Field of Classification Search
CPC ............ H02J 7/025; H02J 50/20; H02J 7/007; H02J 7/0054; H02J 50/10
USPC ........................................................ 320/103
See application file for complete search history.

(56) References Cited

U.S. PATENT DOCUMENTS

| | | | |
|---|---|---|---|
| 3,985,357 A | 10/1976 | Miller | |
| 4,123,511 A | 10/1978 | Heintze | |
| 4,301,207 A | 11/1981 | Schomerus | |
| 4,340,053 A | 7/1982 | Sarui | |

(Continued)

FOREIGN PATENT DOCUMENTS

| | | |
|---|---|---|
| CN | 101783931 | 7/2010 |
| WO | 2009130199 | 10/2009 |
| WO | 2013105920 | 7/2013 |

OTHER PUBLICATIONS

Azimi, R., et al., "Vehicular Networks for Collision Avoidance at Intersections", Society for Automotive Engineers (SAE) World Congress, Apr. 2014.

(Continued)

*Primary Examiner* — Nathaniel Pelton
(74) *Attorney, Agent, or Firm* — Fitch, Even, Tabin & Flannery LLP

(57) ABSTRACT

Some embodiments provide a portable consumer electronic device comprising: a battery; a user interface configured to provide a user with information and receive inputs from a user; and a wireless power distribution circuitry coupled with the battery, wherein the wireless power distribution circuitry comprises: a power transfer antenna electrically coupled with the battery and configured to wirelessly and inductively couple with a separate second portable consumer electronic device that is configured to wirelessly and inductively couple with the portable consumer electronic device, and the wireless power distribution circuitry is configured to wirelessly transfer power from the battery through the power transfer antenna to the second portable consumer electronic device; and a power supply controller configured to control the wireless transfer of power through the power transfer antenna.

16 Claims, 6 Drawing Sheets

(56) References Cited

U.S. PATENT DOCUMENTS

| | | | |
|---|---|---|---|
| 4,463,949 A | 8/1984 | McCoy, Sr. | |
| 4,625,336 A | 12/1986 | Derderian | |
| 4,962,935 A | 10/1990 | Williams | |
| 4,992,003 A | 2/1991 | Perach | |
| 5,154,266 A | 10/1992 | Bieber | |
| 5,201,075 A | 4/1993 | Svetich | |
| 5,219,316 A | 6/1993 | Huffman | |
| 5,413,328 A | 5/1995 | Glancey | |
| 5,639,243 A | 6/1997 | Ryan | |
| 5,755,405 A | 5/1998 | Socha | |
| 5,927,233 A | 7/1999 | Mainini | |
| 6,401,250 B1 | 6/2002 | McNabb | |
| 6,438,755 B1 | 8/2002 | MacDonald | |
| 6,588,840 B1 | 7/2003 | Lombardo | |
| 6,742,636 B2 | 6/2004 | Godshaw | |
| 6,810,831 B1 | 11/2004 | Opfel | |
| 6,910,447 B1 | 6/2005 | Azarian | |
| 6,946,817 B2 | 9/2005 | Fischer et al. | |
| 7,323,981 B2 | 1/2008 | Peel | |
| 7,328,671 B2 | 2/2008 | Kates | |
| 7,416,123 B2 | 8/2008 | Saperstein | |
| 7,438,356 B2 | 10/2008 | Howman | |
| 7,451,927 B2 | 11/2008 | Saperstein | |
| 7,626,966 B1 | 12/2009 | Ruiter | |
| 7,714,708 B2 | 5/2010 | Brackmann | |
| 7,753,826 B1 | 7/2010 | Oliver | |
| 7,768,150 B2 * | 8/2010 | Platania | H02J 7/0065 307/19 |
| 7,770,539 B1 | 8/2010 | Zimmerman | |
| 7,818,820 B2 | 10/2010 | Tsujimoto | |
| 7,916,025 B2 | 3/2011 | Locker | |
| 7,962,186 B2 | 6/2011 | Cui et al. | |
| 8,149,748 B2 | 4/2012 | Bata | |
| 8,233,846 B2 | 7/2012 | Rofougaran | |
| 8,253,557 B2 | 8/2012 | Ani | |
| 8,366,570 B1 | 2/2013 | DeMarco | |
| 8,526,970 B2 | 9/2013 | Wala et al. | |
| 8,568,191 B2 | 10/2013 | Rehkemper | |
| 8,583,182 B2 * | 11/2013 | Piirainen | H04W 24/02 455/443 |
| 8,609,454 B2 | 12/2013 | Dai | |
| 8,624,743 B2 | 1/2014 | Langer | |
| 8,719,001 B1 | 5/2014 | Izdepski et al. | |
| 8,878,671 B2 | 11/2014 | Buchheim | |
| 2004/0125493 A1 | 7/2004 | Shimotono | |
| 2004/0141635 A1 | 7/2004 | Liang | |
| 2004/0167367 A1 | 8/2004 | Beierle | |
| 2005/0034083 A1 | 2/2005 | Jaeger | |
| 2005/0127868 A1 * | 6/2005 | Calhoon | G06F 1/26 320/108 |
| 2005/0259033 A1 | 11/2005 | Levine | |
| 2005/0284405 A1 | 12/2005 | Pomakoy-Poole | |
| 2006/0063540 A1 | 3/2006 | Beuck | |
| 2006/0080072 A1 | 4/2006 | Lachman | |
| 2006/0154642 A1 | 7/2006 | Scannell | |
| 2006/0242901 A1 | 11/2006 | Casimaty | |
| 2007/0069687 A1 * | 3/2007 | Suzuki | H02J 7/0036 320/108 |
| 2007/0130893 A1 | 6/2007 | Davies | |
| 2007/0138272 A1 | 6/2007 | Saperstein | |
| 2007/0138273 A1 | 6/2007 | Saperstein | |
| 2007/0152479 A1 | 7/2007 | Howman | |
| 2007/0243296 A1 | 10/2007 | Bourassa | |
| 2008/0036610 A1 | 2/2008 | Hokuf | |
| 2008/0120768 A1 | 5/2008 | Tsujimoto | |
| 2008/0173257 A1 | 7/2008 | Steiner | |
| 2008/0229704 A1 | 9/2008 | Augustyniak | |
| 2009/0118869 A1 | 5/2009 | Cauchy | |
| 2009/0203367 A1 | 8/2009 | Pamminger | |
| 2010/0119755 A1 | 5/2010 | Chung | |
| 2010/0123778 A1 | 5/2010 | Hada | |
| 2010/0152545 A1 | 6/2010 | Ramsay | |
| 2010/0295687 A1 | 11/2010 | Kuzniar | |
| 2011/0005466 A1 | 1/2011 | Furth | |
| 2011/0031928 A1 | 2/2011 | Soar | |
| 2011/0105099 A1 | 5/2011 | Roll | |
| 2012/0069051 A1 | 3/2012 | Hagbi | |
| 2012/0099800 A1 | 4/2012 | Llano | |
| 2012/0184200 A1 | 7/2012 | Chutorash et al. | |
| 2012/0303939 A1 | 11/2012 | Cain et al. | |
| 2012/0319487 A1 | 12/2012 | Shah | |
| 2013/0056929 A1 | 3/2013 | Rehkemper | |
| 2013/0068942 A1 | 3/2013 | Verenchikov | |
| 2013/0093220 A1 | 4/2013 | Pajic | |
| 2013/0134923 A1 * | 5/2013 | Smith | G06F 1/26 320/103 |
| 2013/0141251 A1 | 6/2013 | Sims | |
| 2013/0292976 A1 | 11/2013 | Kane | |
| 2014/0023060 A1 | 1/2014 | Apte et al. | |
| 2014/0025805 A1 | 1/2014 | Apte | |
| 2014/0104046 A1 | 4/2014 | Howell | |
| 2014/0117921 A1 * | 5/2014 | Suomela | H04B 5/0031 320/103 |
| 2014/0118635 A1 | 5/2014 | Yang | |
| 2014/0148095 A1 | 5/2014 | Smith et al. | |
| 2014/0179463 A1 | 6/2014 | Giles | |
| 2015/0348413 A1 | 12/2015 | Han | |
| 2015/0349537 A1 | 12/2015 | Milne | |
| 2016/0019515 A1 | 1/2016 | Milne | |
| 2016/0019788 A1 | 1/2016 | Milne | |
| 2016/0021492 A1 | 1/2016 | Carlsson | |
| 2016/0021493 A1 | 1/2016 | Milne | |
| 2016/0021510 A1 | 1/2016 | Milne | |
| 2016/0049993 A1 | 2/2016 | McCoy | |

OTHER PUBLICATIONS

Dahiya, A., et al., "A Comparative Study of MANET and VANET Environment", Journal of Computing, www.sites.google.com/site/JournalofComputing/, Jul. 2010, vol. 2, Issue 7, 2151-9617.

Eichler, S., et al., "Simulation of Car-to-Car Messaging: Analyzing the Impact on the Road Traffic", IEEE Computer Society, (2005).

Gonzalvez, J., et al., "IEEE 802.11p Vehicle to Infrastructure Communications in Urban Environments", IEEE Communications Magazine, vol. 50, No. 5, pp. 176-183, May 2012.

Kosch, T., et al., "The Scalability problem of Vehicular ad hoc networks and how to solve it", www.alexandria.unisg.ch/Publikationen/30977, IEEE Wireless Communications Magazine, No. 5, S.6., (Oct. 2006).

Rawat, D., "Enhancing VANET Performance by joint Adaptation of Transmission Power and Contention Window Size", IEEE Transaction on Parallel and Distributed Systems, vol. 22, No. 9, pp. 1528-1535, Sep. 2011.

Saeed, Y., et al., "Obstacle Management in VANET using Game Theory and Fuzzy Logic Control", ACEEE Int. J. on Communications, vol. 4, No. 1, Jul. 2013.

The seventh ACM International Workshop on Vehicular Inter-Networking (VANET 2010) in conjunction with ACM MobiCom 2010. Sep. 24, 2010.

U.S. Appl. No. 14/332,919; Office Action mailed Jan. 20, 2016.

U.S. Appl. No. 14/333,006; Office Action mailed Aug. 27, 2015.

U.S. Appl. No. 14/332,900; Office Action mailed Jan. 14, 2016.

U.S. Appl. No. 14/332,900; Response to Office Action filed Jan. 15, 2016.

U.S. Appl. No. 14/333,006; Final Office Action mailed Oct. 28, 2015.

U.S. Appl. No. 14/333,006; Office Action mailed Dec. 4, 2015.

U.S. Appl. No. 14/333,006; Response to Final Office Action filed Oct. 28, 2015.

U.S. Appl. No. 14/333,006; Response to Office Action filed Dec. 10, 2015.

U.S. Appl. No. 14/333,006; Response to Office Action filed Aug. 31, 2015.

Zhang, T., et al., VNTA sub-TC, www.danielwireless.com/vnta/, IEEE Communications Society, Jun. 2014.

U.S. Appl. No. 14/290,426, filed May 29, 2014; pp. 38.

U.S. Appl. No. 14/460,224, filed Aug. 14, 2014; pp. 43.

Eveready Industries India Ltd.; Mobile Power Pack (2200aAH); http://www.ultimamobilepowercom/products/pdfs/um-22.pdf; Dec. 3, 2012; p. 1.

(56) References Cited

OTHER PUBLICATIONS

Eveready Industries India Ltd.; Eveready Ultima Mobile Power Pack UM22; http://www.ultimamobilepower.com/products/UM-22.aspx; Dec. 3, 2012; p. 1.
Computerworld Inc.; "Intel wants your next PC to have no wires"; http://www.computerworld.com/s/article/9248824/Intel_wants_your_next_PC_to_have_no_wires; Jun. 4, 2014; p. 1-4.
Taiwan Interantional Patent Office; Taiwan Patent App. No. 104121483; International Search Report mailed Apr. 22, 2016.
Taiwan International Patent Office; Taiwan Patent App. No. 104121483; Taiwan Office Action mailed Apr. 22, 2016.

* cited by examiner

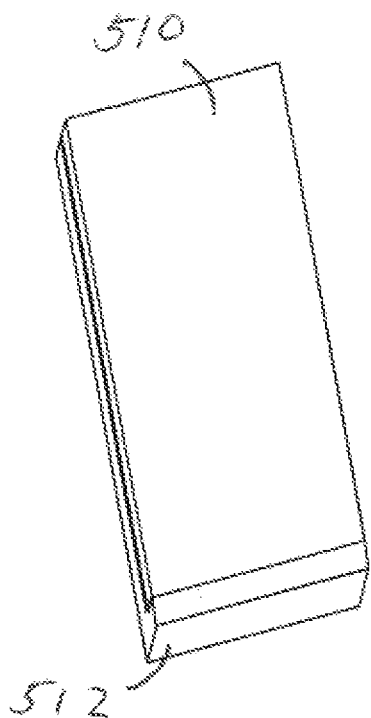
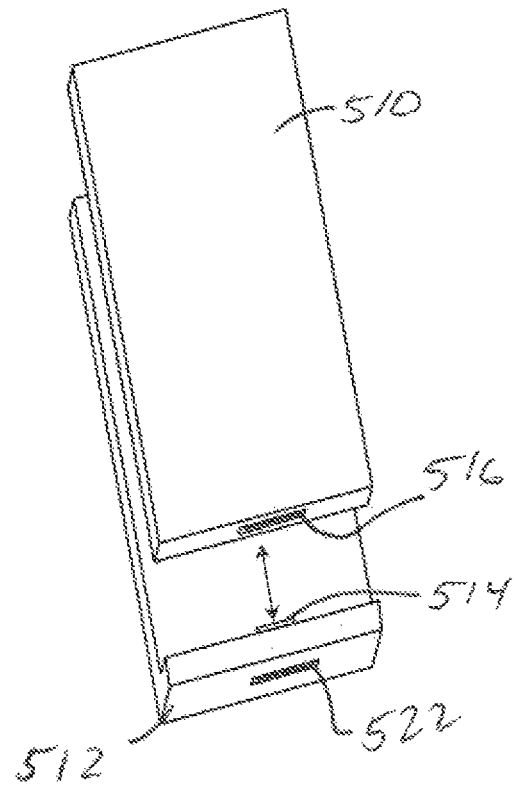
FIG. 5A  FIG. 5B
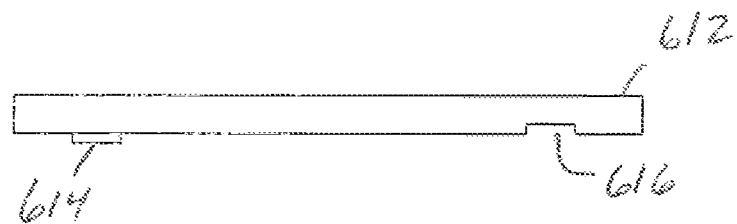
FIG. 6

PORTABLE DEVICE TO PORTABLE DEVICE WIRELESS POWER TRANSFER METHODS AND SYSTEMS

RELATED APPLICATION

This application is related to co-pending U.S. application Ser. No. 14/290,426, filed on the same date and entitled SCALABLE ANTENNA SYSTEM, which is incorporated in its entirety herein by reference.

BACKGROUND

1. Field of the Invention

The present invention relates generally to consumer electronic devices, and more specifically to powering portable consumer electronic devices.

2. Discussion of the Related Art

The number and types of consumer electronic devices continues to increase. Further, many of these consumer electronic devices are portable. As such, battery power is often critical.

In many instances, a user may have to limit their use of a device because of limited remaining power. Similarly, a user may be unable to effectively use a device because of a lack of power stored on the device.

SUMMARY OF THE INVENTION

Some embodiments provide a portable consumer electronic device comprising: a battery; a user interface configured to provide a user with information and receive inputs from a user; and a wireless power distribution circuitry coupled with the battery, wherein the wireless power distribution circuitry comprises: a power transfer antenna electrically coupled with the battery and configured to wirelessly and inductively couple with a separate second portable consumer electronic device that is configured to wirelessly and inductively couple with the portable consumer electronic device, and the wireless power distribution circuitry is configured to wirelessly transfer power from the battery through the power transfer antenna to the second portable consumer electronic device; and a power supply controller configured to control the wireless transfer of power through the power transfer antenna.

Further, some embodiments provide methods of wirelessly transferring power, comprising: wirelessly and inductively coupling a power transfer antenna of a wireless power distribution circuitry of a first portable consumer electronic device with a separate second portable consumer electronic device that is configured to wirelessly and inductively couple with the power transfer antenna, wherein the first portable consumer electronic device comprises a battery and a user interface that is configured to provide a user with information and receive inputs from a user; and wirelessly transferring power from the battery of the first portable consumer electronic device through the power transfer antenna to the second portable consumer electronic device.

BRIEF DESCRIPTION OF THE DRAWINGS

The above and other aspects, features and advantages of several embodiments of the present invention will be more apparent from the following more particular description thereof, presented in conjunction with the following drawings.

FIG. 5A shows a simplified perspective view of a portable CE device cooperated with a wireless power transfer casing, in accordance with some embodiments.

FIG. 5B shows a simplified perspective view of the portable CE device detached from the wireless power transfer casing of FIG. 5A, in accordance with some embodiments.

FIG. 6 shows a simplified side view of a CE device that includes alignment components, in accordance with some embodiments.

Figure 1:
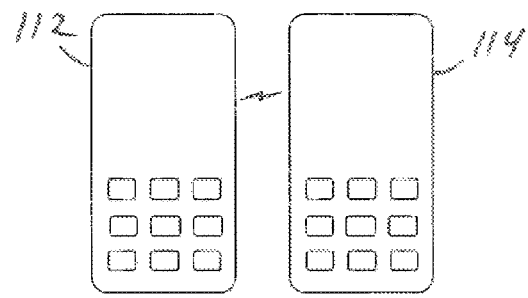
FIG. 1 shows a simplified block diagram of two portable consumer electronic (CE) devices positions proximate each other, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many users have portable consumer electronic devices that are powered by a battery and/or other such local power storage. Often a user may deplete the power resulting in the user being unable to use the device or have to severely restrict the use of the device. Some embodiments, however, allow a user to wirelessly obtain power from one or more other portable consumer electronic devices. For example, some embodiments allow one cell phone to obtain power from and/or use battery power from another cell phone.

It is a common situation where two people have smart phones with very different levels of battery charge remaining. For example, multiple portable devices (e.g., smart phones) are in a location with one or more of them having a significantly low battery charge where the person(s) with the low battery level would like to or needs to do things with their device. This may be due to the fact that they are the type of person that is always interfacing with their phone, or this may be due to the fact that there are a lot of remote people communicating with that person, possibly due to a big recent event where communication is important. Since these remote people communicating with the person having the phone number of the smart phone with the low power set up in their contacts, it is often not convenient for that person to just use another person's phone that has more battery power. Similarly, a person's mobile device may be low on battery power because it has not been charged recently, while another person's device may have a nearly full battery because it has recently been charged.

FIG. 1 shows a simplified block diagram of two portable consumer electronic (CE) devices 112, 114 positions proximate each other, in accordance with some embodiments. The two CE devices are further cooperatively operating to wirelessly transfer power from the first portable CE device 112 to the second portable CE device 114. As such, the second portable CE device 114 is able to acquire power from the first portable CE device 112 and continue to operate and/or to at least partially store electrical power to be used by the second CE device. The CE devices can be substantially any portable CE device that is configured with a wireless power transfer system and/or capability. For example, the portable CE devices can be a smart phone, tablet, laptop, cell phone, gaming device (e.g., a PlayStation Portable, etc.), multimedia player (e.g., DVD/Blu-ray player, iPod, MP3 player, etc.), battery packs, and other such portable CE devices. Further, the first CE device 112 does not have to be the same type of device as the second CE device 114. For example, the first portable CE device 112 may be a smart phone while the second CE device 114 is a tablet.

Figure 2:
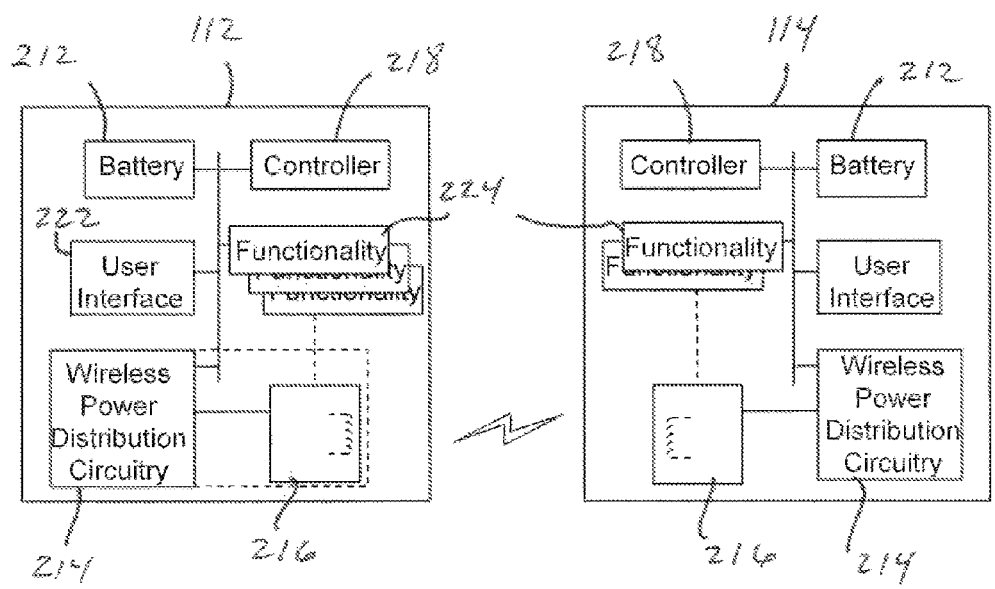
FIG. 2 shows a simplified block diagram of a first portable CE device positioned proximate to and wirelessly and inductively coupled with a second portable CE device, in accordance with some embodiments.

FIG. 2 shows a simplified block diagram of a first portable consumer electronic (CE) device 112 positioned proximate to and wirelessly and inductively coupled with a second portable CE device 114, in accordance with some embodiments. The first CE device 112 includes one or more power storage circuitry or systems 212, one or more wireless power distribution circuitry and/or systems 214, one or more power transfer antennas 216 and one or more controllers 218. The first CE device typically also includes a user interface 222 that allows the user to interact with the device. Further, the first CE device additionally includes one or more additional functional circuitry 224 that provide the intended functionality of CE device. For example, a smart phone includes functionality circuitry to provide wireless cellular communication, and often also includes functionality circuitry that provides other wireless communication (e.g., Bluetooth, Wi-Fi, etc.), multimedia playback functionality, web browsing, and other such functionality. Similarly, a tablet includes functionality circuitry 224 configured to provide web browsing, multimedia playback, wireless communication, and/or other such functionality. Accordingly, the CE devices include functionality circuitry 224 providing the functional capabilities of the CE devices.

The power storage circuitry 212 allows the first CE device 112 to store and use electrical power. Accordingly, the power storage circuitry can comprise one or more batteries, capacitors, or other such devices configured to store electrical power, or combinations thereof. For simplicity, the power storage circuitry is referred to below as a battery; however, it will be appreciated by those skilled in the art that the power storage is not limited to a battery or single battery. The wireless power distribution circuitry 214 is coupled with the battery 212 (e.g., through direct coupling, a bus, or other such coupling), and configured to implement wireless power transfer between the first CE device 112 and one or more other CE devices (e.g., the second CE device 114).

The controller 218 couples with the wireless power distribution circuitry 214 and provides at least some control over the activation and/or deactivation of the wireless transfer of power. The controller can be implemented through one or more processors, microprocessors, logic, memory and the like. Further, the controller 218 may be a specific controller for controlling the wireless power transfer, or may have additional functionality, such as providing control over some or all of the functionality of the first CE device 112 (e.g., wireless communication, multimedia processing, decoding, encoding, etc.).

The wireless power distribution circuitry 214 is further coupled with the power transfer antenna 216. Further, the power transfer antenna electrically couples with the battery 212 and is configured to wirelessly and inductively couple with a separate second portable CE device 114. The wireless power distribution circuitry is configured to wirelessly transfer power from the battery through the power transfer antenna to the second portable consumer electronic device 114.

In some embodiments, the power transfer antenna is configured to inductively couple with one or more other power transfer antennas 216 or other such devices that are configured of wirelessly receive and/or transmit electrical power from or to the first CE device 112 through the power transfer antenna 216. In some embodiments, the power transfer antenna 216 is part of the wireless power distribution circuitry 214, while in other embodiments it is cooperated with the power distribution circuitry. The power transfer antenna can be formed from one or more coils (e.g., one or more planar coils, helical coils, etc.), circular disc configurations, serpentine configures or other such configurations or combinations of such configurations. Further, the power transfer antenna is shown within the first CE device 112; however, the power transfer antenna may partially extend out of a housing or be fully outside the housing of the first CE device. Still further, one or more of the battery 212, wireless power distribution circuitry 214, the controller 218 and other functionality circuitry 224 may be partially or fully implemented external to the first CE device 112 and cooperated with the CE device.

The second CE device 114 typically also includes at least a power storage circuitry 212, the wireless power distribution circuitry 214, and the power transfer antenna 216. Further, the second CE device typically further includes a user interface 222 and functionality circuitry 224.

The wireless energy transmission can be carried out through direct induction, resonant magnetic induction or other such techniques or combinations of such techniques. In some implementations, the wireless power transfer is implemented through inductive coupling between the power transfer antenna 216 of the first CE device 112 and the power transfer antenna of the second CE device 114. The inductive electrical power transfer is typically over short distances, such as less than 6 inches, and typically less than 2 inches. The power transfer can be implemented through substantially any wireless power transfer techniques and/or standards, such as but not limited to Qi standard, Alliance for Wireless Power (A4WP) standard, Power Matters Alliance (PMA) standard, which are incorporated by reference, and/or other such methods.

Under the Qi specification, low power for inductive transfer typically provides a draw of about 0 to 5 Watts, and typically uses inductive coupling between power transfer antennas or other such devices. For example, in some embodiments the power transfer antenna comprises two planar coils to allow the transfer power between the power transmitter portable CE device to the power receiver portable CE device. The distance between the power transfer antennas is typically less than 15 cm. For example, in some implementations the distance is less than 40 mm, while in many embodiments, the distance is less than about 5 mm.

The wireless power distribution circuitry 214 and/or the controller 218 regulate the output and/or input voltage and/or current, as well as the reception and/or distribution of power. In some embodiments, the wireless power distribution circuitry 214 include one or more digital control loops where a power receiver communicates with the power transmitter and requests more or less power. In some implementations, the communication may be unidirectional (e.g., from the power receiving portable CE device to the power transmitting portable CE device), but typically is bidirectional. The communication may be over cellular, Wi-Fi, Bluetooth, via USB, power modulation (e.g., backscatter modulation), radio-frequency identification (RFID) communications or other such Near Field Communications (NFC), optical communication, and/or other such communication methods or combinations of such methods. In backscatter modulation, the wireless power transfer antenna of a power receiving CE device (e.g., one or more coils) is loaded, changing a current draw at the power transmitting portable CE device. These current changes can be detected and monitored at the power transmitting CE device and demodulated into the information to allow communication and allow the portable CE devices to work together.

In other embodiments, one or both of the portable CE devices include separate communication antennas that allow alternative wireless communication. For example, in some embodiments the portable CE device may include near field communication (NFC) circuitry, which in some instances allows for auto-detection when another portable CE device having the relevant NFC communication functionality is within range NFC.

In some embodiments, the wireless power distribution circuitry 214 further includes charge circuitry and/or power receiver circuitry, such as but not limited to a power pick-up unit. Further, some embodiments include a power conversion unit. The power transfer antenna wirelessly cooperates with the antenna of the power transferring CE device. For example, the power transfer antenna can be configured to capture the magnetic field. The wireless power distribution circuitry 214 and/or the controller 218 regulate the transferred power to levels that are appropriate for the wireless power distribution circuitry, battery 212 and/or other circuitry configured to receive the power. Further, some embodiments include charge circuitry to provide, at least in part, power conversion and/or accumulation to correspond with voltage and/or current levels relevant to the portable CE device.

Figure 3:
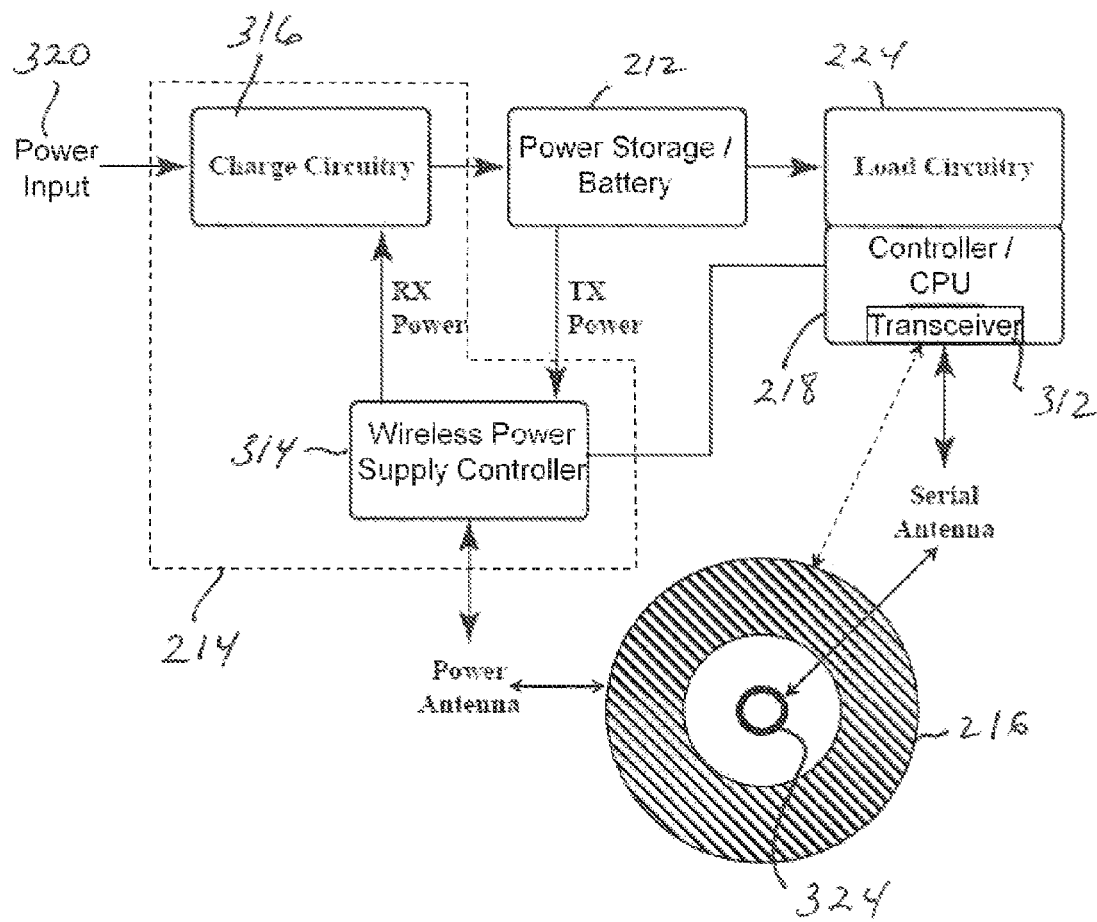
FIG. 3 shows a simplified block diagram of power transfer circuitry that can be used in a portable CE device, in accordance with some embodiments.

FIG. 3 shows a simplified block diagram of power transfer circuitry that can be used in a portable CE device, in accordance with some embodiments. The circuitry includes the one or more batteries 212, one or more wireless power distribution circuitry 214, one or more functionality or load circuitry 224, the controller 218, one or more communication transceivers 312 and the one or more wireless power transfer antennae 216. In some embodiments, the wireless power distribution circuitry 214 includes a wireless power supply controller 314 and charge circuitry 316. Further, some embodiments include one or more communications antennas 324.

In some embodiments, the charge circuitry 316 couples to a standard or intended input power 320. This input power can be through a wall outlet, computer or the like coupled to the portable CE device (e.g., through a USB port, 30 pin connector, or other relevant port or connector (not show) of the portable CE device). Further, the charge circuitry is further coupled with the wireless power supply controller 314 and the battery 212. In some embodiments, the wireless power supply controller 314 further couples with the battery 212 and the wireless power transfer antenna 216. In some embodiments, the controller 218 is communicationally coupled with the wireless power distribution circuitry 214 and/or wireless power supply controller 314 to coordinate the wireless transfer and/or reception of power. This can close the communication loop, for example, between the user approving the transmission or reception of power, notifying when the battery is fully charged or reached a limit of power sharing, and other relevant communications. Further, the wireless power supply controller 314 is typically communicationally coupled with the charge circuitry 316. In some implementations, the controller 218 is further communicationally coupled with the functionality circuitry 224, the charge circuitry 316 and/or the battery 212 or circuitry detecting level of stored power.

The wireless power supply controller 314 couples with the wireless power transfer antenna 216 to supply power to or receive power from the antenna. When operating to transmit power, the wireless power supply controller draws power from the battery to be delivered to and wirelessly transferred through the wireless power transfer antenna 216. Further, the wireless power supply controller 314, when receiving power, pulls power received through the power transfer antenna 216 to be stored in the battery 212 (or other such power storage) through the charge circuitry 316. In some embodiments, the portable CE device may include one or more power transfer antennas used to wirelessly transfer power, and one or more other power transfer antennas to wirelessly receive power.

In some embodiments, standard or intended input power 320 is received through the charge circuitry 316. The charge circuitry 316, in some embodiments, is configured to obtain certain voltage and/or charge levels at which the portable CE device is designed operate and/or use. For example, circuitry of many CE devices expect input voltage, current and/or power to be within a predefined range. The charge circuitry 316 in part controls at least the wirelessly received power, and supplies the power to the battery 212 in charging the battery and/or potentially to other circuitry of the portable CE device.

Further, in some implementations, the charge circuitry 316 is configured to provide power to the battery and/or other circuitry at levels that can effectively be utilized and/or stored. For example, power received by wireless power transfer through the wireless power transfer antenna 216 may be small compared with the standard input power 320. As such, this power level alone may be insufficient to effectively be used in charging the battery and/or supplying power to the circuitry of the portable CE device. Accordingly, in some embodiments, the charge circuitry 316 is further configured to accumulate and/or temporarily store up power at lower levels than those typically received through the input power 320. For example, small or trickle charges may be received through the wireless power transfer, and the charge circuitry can cause the trickle charge to be accrued. Further in some implementations, the charge circuitry 316 can include one or more local power storage circuitry configured to store the received electrical power wirelessly received from the separate portable consumer electronic device, and to discharge the stored electrical power to the battery 212.

Upon the power levels reaching or exceeding a threshold, which may be equal to the expected levels at the power input or another level (such as greater), the charge circuitry 316 can distribute or discharge the accumulated power to the battery 212 and/or distribute the power to one or more other circuitry of the portable CE device (e.g., functionality circuitry 224, controller 218, transceiver 312, etc.). For example, the charge circuitry 316 can comprise one or more capacitors and/or capacitor and resistor (RC) circuitry that store up and discharge upon one or more thresholds being reached.

The battery 212 is further coupled to the functionality circuitry 224, controller 218, transceiver 312 and/or other circuitry of the CE device to supply power for effective operation of the components. As such, the battery can be charged through the power wirelessly received through the power transfer antenna 216 and the wireless power distribution circuitry 214. Further, the battery can discharge that power to provide power for the CE device.

In some embodiments, the portable CE device may further include one or more separate communications antennas 324. The communications antenna 324 may be exclusively configured to provide bi-directional wireless communicate between a separate CE device with which the portable CE device is currently wirelessly coupled and with which it is wirelessly transferring power to or from. The transceiver 312 can be configured to provide bidirectional communication with the second portable CE device and/or other devices. The communication can be via Bluetooth, Wi-Fi, cellular or other relevant communication protocols. In some embodiments, communication is achieved through other communication methods, such as via USB, Ethernet, etc. Similarly, in some implementations, the communications antenna 324 could be replaced by a USB or Ethernet connection. In some embodiments, the communications antenna 324 is a serial communications antenna providing communications with one or more other CE devices that have similarly antenna communications capabilities. Further, in some implementations, the communication can be activated through a pairing process with one or both devices detecting the presence of the other. This pairing may further allow the two devices to recognize that one of the devices is requesting and/or needs power, and the two devices can utilize the communication to coordinate and/or negotiate for the wireless power transfer. For example, a request for power can be issued and/or operating device statistics can be shared. In some implementations, the pairing and/or initiation of communication between two devices is activated by a user, such as through a button, a selection of a displayed option or the like. For example, an option or button can be pressed on a power sending CE device to initiate power availability. The power receiving CE device can coordinate the power transfer and/or can notice passively when power flows through its power receiver.

In some implementations, the transceiver 312 couples with the antenna and uses the communications antenna 324 to transmit and/or receive communications from at least the power receiving CE device 114. The information and/or data communicated can be substantially any information or data, such as but not limited to communications regarding the control of the transfer of power between the first and second portable CE devices. Further, the communications antenna may be a separate antenna from another communications antenna of the portable CE device, such as an antenna configured to provide cellular communication, Bluetooth communication, Wi-Fi communication or other such antennas, while in other embodiments, the communications antenna 324 may be used to provide one or more of the communication functionalities of the portable CE device.

The communications antenna 324 can be substantially any relevant antenna configured for the desired communication. For example, in some embodiments the communications antenna is a serial antenna coupled with the transceiver, and is separate from the wireless power transfer antenna 216. Additionally, in some implementations, the communications antenna 324 is positioned proximate the power transfer antenna, and in some embodiments the communications antenna is concentric with the power transfer antenna. For example, the wireless power transfer antenna 216 and the communications antenna 324 can be configured with generally ring or disc shaped structures, with the communications antenna 324 being positioned within an interior vacant space within the ring structure of the power transfer antenna, or vice versa. The communications antenna 324 may or may not be concentrically located within the power transfer antenna 216. In some configurations, there may be more than one type of antenna located inside or outside of the power transfer antenna 216. The size of the power transfer antenna 216 is typically due to the number of windings to achieve a desired induction connection. The communications antenna is a higher data rate type of antennas can typically be much smaller (e.g., fewer windings or turns) that the power transfer antenna.

Figure 4:
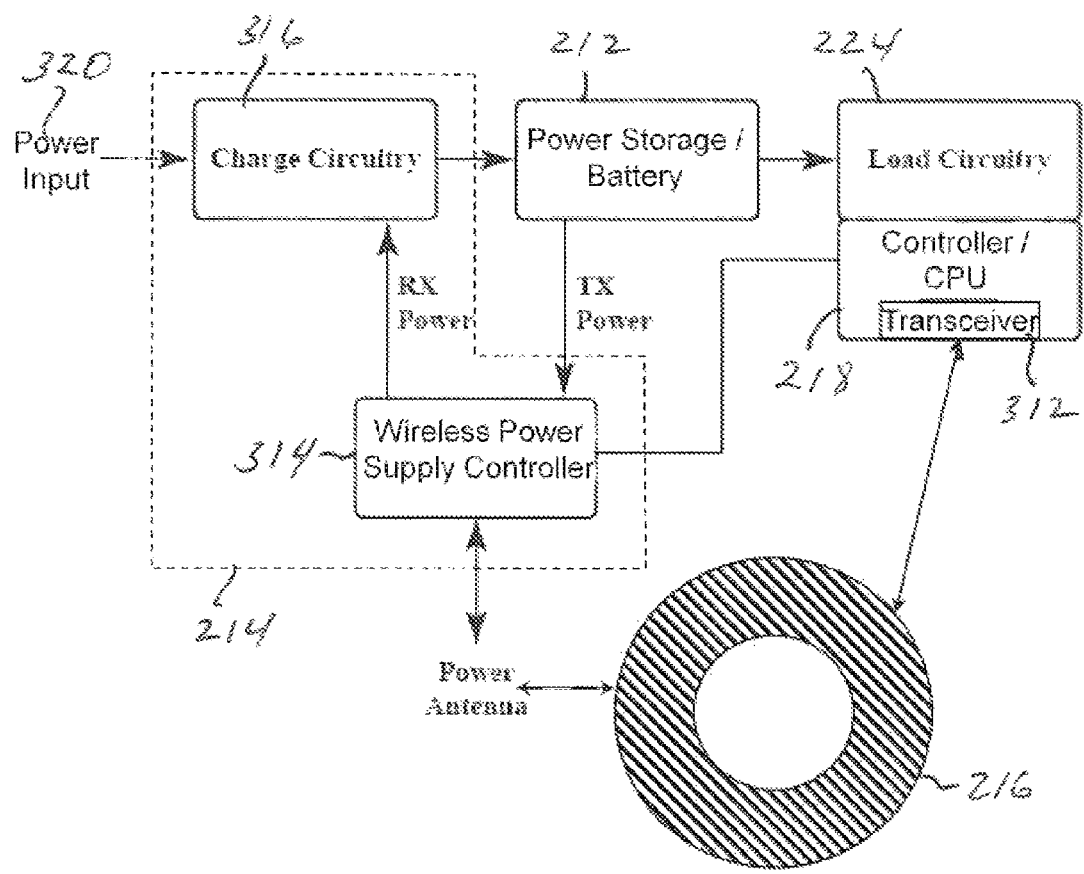
FIG. 4 shows a simplified block diagram of power transfer circuitry that can be used in a portable CE device, in accordance with some embodiments.

FIG. 4 shows a simplified block diagram of power transfer circuitry that can be used in a portable CE device, in accordance with some embodiments. The circuitry includes the battery 212, the wireless power distribution circuitry 214, one or more functionality or load circuitry 224, the controller 218, one or more communication transceivers 312 and the wireless power transfer antenna 216. In some embodiments, the wireless power distribution circuitry 214 includes a wireless power supply controller 314 and charge circuitry 316.

The embodiment depicted in FIG. 4 differs from the embodiment depicted in FIG. 3 in that the circuitry does not include a separate communications antenna. Further, the transceiver 312 couples with the wireless power transfer antenna 216. Accordingly, in some embodiments, the power transfer antenna 216 in cooperation with the transceiver 312 additionally is configured to provide at least some bi-directional communication functionality to wirelessly communicate. For example, the transceiver may be configured to utilize the power transfer antenna to modulate the power transferred to communicate information and/or data to the second portable CE device 114, and to receive and demodulate modulated information from the second portable CE device. In some embodiments, the transceiver 312 or separate transceivers may communicate using the power transfer antenna and a separate communications antenna.

As introduce above, the CE device can include a user interface that allows the user to initiate a power transfer process (e.g., identify and couple with a separate CE device, determine whether sufficient power is available for transfer, and/or initiate and control the wireless power transfer). For example, some CE devices display one or more graphical user interfaces to indicate that wireless power transfer is an option, whether the CE device is being configured to send power, whether the CE device is to receive power, or ignore other CE devices, and/or other such options. Similarly, one or more settings may be configured such that a CE device includes logic to automatically trigger a mode based on a condition (e.g., battery power below a certain level), which may be based on the presence of another CE device capable of transmitting or receiving power.

Further, the transfer of power may not be limited to power from a battery of a CE device. For example, a user of a first portable CE device 112 may not have a power adaptor at a time when recharging is needed, while a user of a second portable CE device may have a power adaptor. As such, the second CE device may be coupled with an external power source using the adaptor (e.g., USB), and the second CE device can wirelessly transfer power received through the power adaptor to the first CE device. Further, the power may be wirelessly transferred from the battery of the second CE device while the second CE device continues to charge the battery with the power received through the adaptor.

In some embodiments, the controller 218 is further configured to provide control over whether wireless power transfer is to take place and/or the resources of the CE device that are available to be utilized in implementing the wireless power transfer. In some implementations, the controller includes code, firmware and/or software that allows a process to acquire, store and/or evaluate power usage data, usage rate, battery level and/or other parameters. Based on the parameters and their relationship to one or more thresholds, the controller 218 can control whether power is supply to other devices, when power being supplied to another device is terminated (e.g., based on one or more set thresholds), what functions may be powered down and unavailable when wirelessly receiving power from another CE device and/or other such controls. As one example, a CE device may be configured to prevent wirelessly transmitting power when already wirelessly receiving power from another device. Similarly, in some embodiments, the controller can coordinate the wireless power transfer with the controller of the other CE device and parameters and/or thresholds of the other CE device.

When wirelessly receiving power, a CE device can be configured to operate as though power were simply drawn from the battery as the wireless power distribution circuitry 214 wirelessly receives and directs the power to the battery 212 (e.g., through the charge circuitry 316). Further, in limiting power loss, a supply or transmitting portable CE device can be configured to not transmit power until it confirms there is a receiving CE device within range to effectively receive the wirelessly transmitted power.

In some embodiments, the controller 218 is further configured limit an amount of power transferred and/or received. For example, the controller 218 can track power levels received and/or transmitted. The amount of power transferred can be compared with one or more thresholds, which are typically user defined but may be default thresholds. Based on the relationship between the transferred power and the thresholds, the controller can be configured to terminate the wireless transmission of power, notify the other CE device that the power transfer should be terminated or the like, or a combination thereof. For example, the power transmission from the source CE device can be shut off when enough power has been transmitted to the receiving CE device, where a traditional charger typically would keep providing power.

Again, the power source CE device and the power receiving CE device can typically bi-directionally communicate with each other. As such, the wireless power transfer can be coordinated and/or negotiated between the CE devices. For example, the communication can be through NFC, Bluetooth, Wi-Fi, or other such communication protocols. Alternatively or additionally, the communication can be implemented through the wireless power transfer antenna 216. For example, a power receiving CE device can passively detect when power is being picked up by its wireless power transfer antennae and/or wireless power distribution circuitry. Again, in some cases a button or other user interface control is activated on one or both CE devices to start the power transfer, which can reduce power losses and/or wasted power due to the CE devices constantly looking for other CE devices. As introduced above and described further below, in some embodiments, the portable CE devices may be coupled via a wired connect (e.g., USB-to-USB, or other connector port to connector port cabling), and the CE devices can detect the cable connected to a communications port.

Further communications can be provided by one or between the CE devices in controlling the wireless transfer of the power. For example, the power receiving CE device can be configured to transmit a status of the power reception, which can be received by the power supplying CE device. The power source CE device can terminate the power transfer and save power when it does not receive confirmation that the power receiving CE device is receiving the power. Similarly, in some embodiments, status information can be communicated between the portable CE devices as the power is being transferred. In some embodiments, a power supplying CE device transmitting power can detect when the receiving CE device is no longer present, for example, through the monitoring of back modulation. The power source CE device can then quit transmitting power. The power source CE device may ping a receiving CE device to try to detect whether the receiving CE device reestablishes a connection so that it may restart the power transmission.

The status information can be used by one or both CE devices in controlling the power transfer. For example, the power receiving CE device can notify the power supplying CE device that sufficient power has been received, that it is terminating the power transfer (e.g., user is leaving the area), that insufficient power is being received, that the coupling does not meet a threshold, or other such communications. Similar communications can be transmitted by the supplying CE devices.

In some embodiments, the coupling between CE devices can be initiated even when one or both CE devices are in a sleep or power save mode. This can be similar to a smart phone being in a power save or sleep mode and still receiving cellular calls, texts or other communications. For example, a portable CE device can be configured to periodically activate low power communications (e.g., now power NFC communications) to determine whether one or more CE devices are present that may want to participate in a wireless power transfer (either by transmitting or receiving a communication, ping or the like). As introduced above, the CE devices can take other actions to limit power drains while wirelessly transferring and/or receiving power. For example, a display screen can be power down when not in use, and other functionality circuitry, applications and/or operations can be powered down, paused and/or terminated.

In some embodiments, one or more user interfaces are provided (e.g., through a display screen) that allows a user to set parameters, limits and/or control the wireless transfer of power. Factors that may be controlled can include one or more of, but not limited to, battery level of the source CE device, battery level of the recipient CE device, amount of power transferred, identity of the recipient CE device, power usage rate of the source CE device, power usage rate of the recipient CE device, efficiency of the power transfer, battery capacity of the source CE device, battery capacity of the recipient CE device, whether wired charging active to the source CE device, whether wired charging is active to the recipient CE device, time of day, day of week, date, a cumulative amount of charging received by the recipient CE device and other such factors. As a further example, in some embodiments, the capability to transfer and/or receive wireless power may be an option that is paid for (e.g., an upgrade, a service paid for, or the like). Accordingly, the ability to wireless receive to transfer power may be limited on a user's account, an amount paid, number of credits available to a user and the like.

Further, in some implementations a user or CE device may accrue credits as the CE device wireless transfers power to another CE device. These credits can then be used when later receiving power, or redeemed for other benefits (e.g., upgrades, access to content, access to applications, etc.). Some embodiments, further limit wireless power transfer between devices that are authorized. For example, a user may specify devices with which her/his CE device is authorized to transfer power. Accordingly, the controller 218 or other authentication system of the CE device can perform an authentication process with the other CE device (e.g., CE device might recognize particular recipient devices) before wireless power transfer is authorized. A CE device may additionally or alternatively communicate with a remote service (e.g., wireless cellular carrier service) to obtain authentication and/or authorization (e.g., the CE device has paid for this service) before wireless power transfer can be initiated. Further authentication may be needed, such as username and/or password to initiate power transfer. In some embodiments, a CE device and/or a service may allow a recipient user to pay for the service of wireless power transfer (e.g., subscriptions, a one-time fee, metered payment based on amount of power transferred and/or received, and the like). A one-time fee might be for a single charge or for a quantity of power to be transmitted. Micro payments may be used for the metered payments. For example, a user may obtain a subscription in a coffee shop to take advantage of this wireless power transfer functionality. Further, the controller or other circuitry may track amounts of power transmitted or received and report that to a service for billing.

Still further, in some embodiments, the controller 218 preforms an authorization of the other CE device and/or tracks power transfer for billing and/or limits which CE devices (or users associated with specific CE devices) are allowed to receive power and/or to inductively couple. Additionally, the controller may control an amount and/or limit the amount of power that can be transferred and/or received.

In some embodiments, the wireless power distribution circuitry 214 is integrated with other charge circuitry, such as through plug-in chargers, car charges or the like. Further, some embodiments include dedicated battery packs, which can act as sources of power though the wireless power distribution circuitry. Some CE devices may only be configured to wirelessly receive or wirelessly transfer power.

Further, in some embodiments, some or all of the circuitry and/or battery utilized in providing the wireless power transfer and/or communication while providing wireless power transfer can be implemented in casing, clip or other device that cooperates with and/or is fixed to an exterior of a CE device. For example, the wireless power distribution circuitry can be detachable from the portable CE device.

FIG. 5A shows a simplified perspective view of a portable CE device 510 cooperated with a wireless power transfer casing 512, in accordance with some embodiments. FIG. 5B shows a simplified perspective view of the portable CE device 510 detached from the wireless power transfer casing 512, in accordance with some embodiments. The power transfer casing 512 includes a housing, and typically includes a connector 514 that mates with a connector 516 of the portable CE device 510. In some embodiments, the casing connector 514 and the CE device connector 516 cooperate to provide communication and/or power transfer between the CE device and the power transfer casing 512. Some or all of the power transfer antenna 216, wireless power distribution circuitry 214, charge circuitry 316, battery 212, controller 218 and communications antenna 324 can be positioned within the power transfer casing 512. For example, the power transfer casing may include one or more batteries 212 and/or other such power storage devices, the power transfer antenna 216 and some or all of the wireless power distribution circuitry 214. Additionally or alternatively, in some embodiments the power transfer casing can cooperatively use the battery, communication functionality and/or control of the portable CE device. In some embodiments the wireless power transfer antenna, some of the battery and controls can be a modular unit that can be used with the CE device or potentially many different CE devices.

The power transfer casing 512 can be configured to cooperate with the portable CE device 510 such that a user interface and/or display of the portable CE device is at least partially visible and accessible to the user from an exterior of the housing of the power transfer casing. Further, the power transfer casing can include the wireless power distribution circuitry 214 such that the wireless power distribution circuitry is detachable from the CE device and/or the housing of the CE device. In some embodiments, the power transfer casing 512 includes another externally accessible connector or port 522 that allows the power transfer casing to connect to an external power source. As an example, the power transfer casing can include a USB port (lightning connector, 30 pin connector, etc.) that can be attached to a charger or other device for charging. Power from the external source can at least partially be directed to the battery 212 of the CE device, and to a battery within the casing 512 when relevant. This also has the advantage that normal wear and tear will apply to the port in the casing rather than a port built into the CE device, which typically is easier to replace. In some implementations, the power transfer casing and/or the CE device can include one or more solar panels to provide more power and/or can be configured to connect with solar panels. In some implementations the power transfer case can be a car cradle and/or a home cradle that at least aids in providing the wireless power transfer.

The case can provide a connector (e.g., USB port) that can be attached to a charger for charging. This also has the advantage that normal wear and tear will wear out the connector in the case rather than the connector built into the CE device, which is easier to replace. The case can have solar panels on it to provide more power. If enough solar panels are attached then the case can act as a wireless power source. The case may optionally have a spare battery in the case. Further, some or all of the power transfer controls may be incorporated into the casing. Accordingly, the power transfer casing can be configured, unlike many other wirelessly power transfer devices, to quit transmitting power, which can conserve battery power.

Further, in some embodiments, the first portable CE devices 112, the power transfer casings 512 and/or other clipping systems include one or more alignment members, structures, components or the like that aid in position a first CE device 112 or power transfer casing to align with a second CE device 114 to enhance alignment and/or provide an ideal alignment for power transfer efficiency.

FIG. 6 shows a simplified side view of a CE device 612 that includes alignment components 614, 616 that can physically cooperate with corresponding alignment structures of a second CE device, in accordance with some embodiments. The alignment components can be substantially any structure such as but not limited to protrusions, recesses, magnetic features (whether internal or external to a housing), clips or other such structures or a combination of such structures. In some embodiments, the one or more alignment components allow the distance between power transfer antennas of at least two portable CE devices to be minimized and thus increasing the power transmission efficiency. Similarly, the alignment components can provide a desired orientation of the two or more antennas to enhance transmission efficiency.

In other embodiments, a casing, clip, cradle or the like is provided that is configured to receive two or more CE devices in optimal positions and/or orientations to enhance and/or improve the efficiency of the wireless power transmission. For example, the casing may be configured to receive two CE devices such that they are positioned back to back with their corresponding wireless power transceivers positioned close to each other and aligned.

Figure 7:
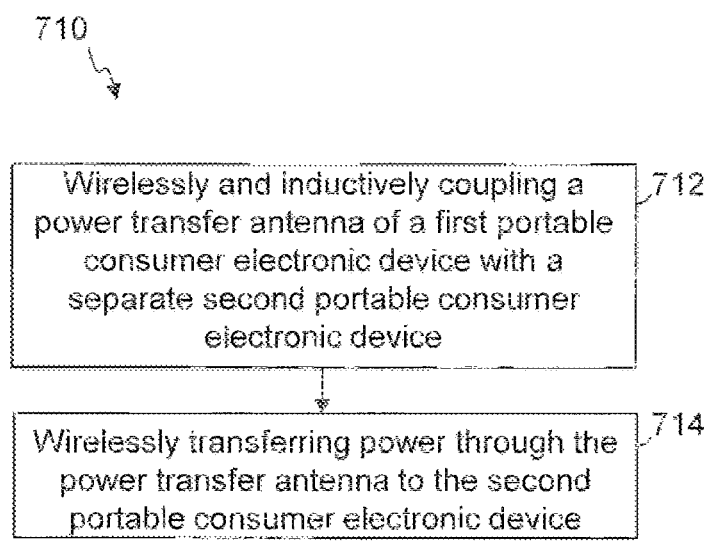
FIG. 7 shows a simplified flow diagram of a process for use in wirelessly transferring power between two or more portable CE devices, in accordance with some embodiments.

FIG. 7 shows a simplified flow diagram of a process 710 for use in wirelessly transferring power between two or more portable CE devices 112, 114, in accordance with some embodiments. In step 712, a power transfer antenna of a wireless power distribution circuitry of a first portable consumer electronic device is wirelessly and inductively coupled with a separate second portable consumer electronic device that is configured to wirelessly and inductively couple with the power transfer antenna, wherein the first portable consumer electronic device comprises a battery and a user interface that is configured to provide a user with information and receive inputs from a user. In step 714, electrical power is wirelessly transferred from the battery of the first portable consumer electronic device through the power transfer antenna to the second portable consumer electronic device.

Figure 8:
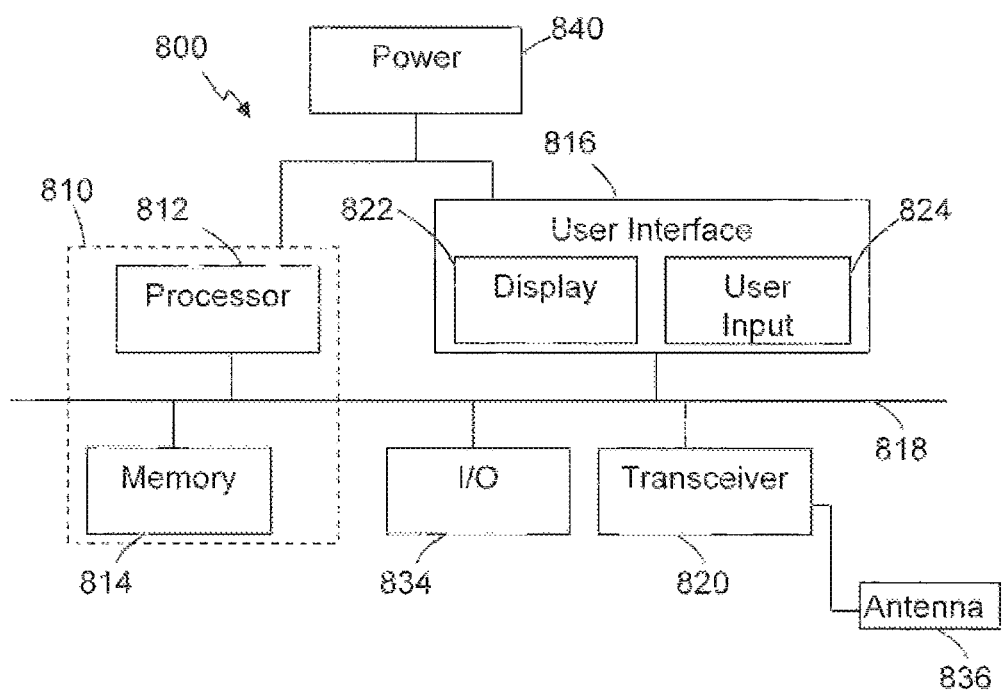
FIG. 8 illustrates a system for use in implementing methods, techniques, devices, apparatuses, systems, circuitry, servers, sources and the like in allowing CE devices to wirelessly transfer power to another CE device, in accordance with some embodiments.

The processes, methods, techniques, circuitry, systems, devices, services, servers, sources and the like described herein may be utilized, implemented and/or run on many different types of devices and/or systems. Referring to FIG. 8, there is illustrated a system 800 that may be used for any such implementations, in accordance with some embodiments. One or more components of the system 800 may be used for implementing any system, apparatus, circuitry or device mentioned above or below, or parts of such systems, apparatuses, circuitry or devices, such as for example any of the above or below mentioned CE devices 112, 114, 510, power transfer casings 512, controllers 218, user interfaces 222, wireless power distribution circuitry 214, functionality circuitry 224 and the like. However, the use of the system 800 or any portion thereof is certainly not required.

By way of example, the system 800 may comprise a controller or processor module or circuitry 812, memory 814, a user interface 816, and one or more communication links, paths, buses or the like 818. A power source, battery or supply 840 is included or coupled with the system 800. The controller 812 can be implemented through one or more processors, microprocessors, central processing unit, logic, local digital storage, firmware and/or other control hardware and/or software, and may be used to execute or assist in controlling and/or implementing wireless power transfer, executing the steps of the processes, methods and techniques described herein, and control various communications, programs, content, listings, services, interfaces, etc. Further, in some embodiments, the controller 812 can be part of a control system 810 and/or implemented through one or more processors with access to one or more memory 814. The user interface 816 can allow a user to interact with the system 800 and receive information through the system. In some instances, the user interface 816 includes a display 822, which may include a touch screen, and/or one or more user inputs 824, such as a remote control, keyboard, mouse, track ball, game controller, buttons, touch screen, etc., which can be part of or wired or wirelessly coupled with the system 800.

Typically, the system 800 further includes one or more communication interfaces, ports, transceivers 820 and the like allowing the system 800 to communication over a communication bus, a distributed network, a local network, the Internet, communication link 818, other networks or communication channels with other devices and/or other such communications or combinations thereof. Further the transceiver 820 can be configured for wired, wireless, optical, fiber optical cable or other such communication configurations or combinations of such communications. The system 800 further includes one or more antennae 836, typically at least a power transfer antenna, and in some implementations one or more communications antennae. One or more inputs and/or outputs 834 are provided, such as power and/or communication ports, audio adaptor ports, etc.

The system 800 comprises an example of a control and/or processor-based system with the controller 812. Again, the controller 812 can be implemented through one or more processors, controllers, central processing units, logic, software and the like. Further, in some implementations the controller 812 may provide multiprocessor functionality.

The memory 814, which can be accessed by the controller 812, typically includes one or more processor readable and/or computer readable media accessed by at least the controller 812, and can include volatile and/or nonvolatile media, such as RAM, ROM, EEPROM, flash memory and/or other memory technology. Further, the memory 814 is shown as internal to the system 810; however, the memory

814 can be internal, external or a combination of internal and external memory. Similarly, some or all of the memory 814 can be internal, external or a combination of internal and external memory of the controller 812. The external memory can be substantially any relevant memory such as, but not limited to, one or more of flash memory secure digital (SD) card, universal serial bus (USB) stick or drive, other memory cards, hard drive and other such memory or combinations of such memory. The memory 814 can store code, software, executables, scripts, data, content, multimedia content, programming, programs, media stream, media files, textual content, identifiers, log or history data, user information, CE device information and the like.

One or more of the embodiments, methods, processes, approaches, and/or techniques described above or below may be implemented in one or more computer programs executable by a processor-based system. By way of example, such a processor based system may comprise the processor based system 800, a cellular phone (e.g., a smart phone), a tablet, a laptop, a IP enabled television, a Blu-ray player, an IP enabled Blu-ray player, a DVD player, entertainment system, gaming device, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques to enable the wireless power transfer between two or more CE devices. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: wirelessly and inductively coupling a power transfer antenna of a wireless power distribution circuitry of a first portable consumer electronic device with a separate second portable consumer electronic device that is configured to wirelessly and inductively couple with the power transfer antenna, wherein the first portable consumer electronic device comprises a battery and a user interface that is configured to provide a user with information and receive inputs from a user; and wirelessly transferring power from the battery of the first portable consumer electronic device through the power transfer antenna to the second portable consumer electronic device.

Some embodiments allow a first CE device to use battery power from a second CE device. It is a common situation where two people will have cell phones with very different levels of battery charge remaining. When the person with the first CE device having lower battery level has some communication that they want to do and are worried about running their battery down to the point where their CE device will no longer function, the first CE device can use some power from the battery in the second CE device that has a greater change remaining. It is noted, that the power transfer between two or more CE devices can additionally or alternatively be via wired coupling. For example, a cable can connect between connectors on each CE device and the power transfer can additionally or alternatively be via the cable.

Some embodiments provide the capability to allow a first CE device (e.g., cell phone) to run off of a battery in another CE device (e.g., cell phone). Further, some embodiments are configured to wirelessly transmit power between CE devices. Additionally or alternatively, some embodiments are configured to plug a charging cable directly from one CE device to another CE device to allow one of the CE devices to run off of the battery in the other CE device. In some implementations, the source CE device includes a power transfer mode that has to be activated to act as a power source first. The activation of the mode may be user devices, defined by a service provider, defined by a user's level of service, whether a user has paid to take advantage of wireless power transfers and/or wired power transfers between CE devices, etc. Similarly, in some embodiments, a first portable CE device comprises an ability to recognize that it is cooperated or attached to a battery powered source of a separate second portable CE device such that the first CE device runs off of the attached power from the second CE device but the first CE does not attempt to charge its battery from the power being received from the second CE device. A CE device is, in some embodiments, configured to operate off of power from its internal battery combined with power from a battery in another CE device, where at least one of the batteries does not have enough charge left to run the CE on its own.

In some embodiments, a first CE device is further configured to operate in a mode when turned off that another CE wired or wirelessly cooperated with it can draw power from the first CE device's battery. Further, a CE device with the capability to wirelessly supply power can operate in a mode that when turned on it can act as a source to another CE device attached to it when it senses that the other CE device is a client device and not a source device. In some implantations, a recipient portable CE device uses just enough power to operate minimal functionality, such as keep running and listen for incoming communications, where it otherwise might have drained its battery to the point where the CE device would have to shut itself off.

In some embodiments, a first CE device attached to a wired power source can wirelessly transmit power from the wired power source to a second CE device in addition to charging the one or more batteries of the first CE device from the wired power source. Similarly, a CE device may wirelessly receive power from a wirelessly power pad or other such device that includes one or more power transfer antennas, and the CE device may be further configured to supply power received from the pad through the internal power transfer antenna of the CE device to one or more other CE devices. The pad or device may also be configured allow at least one portable CE device to attach to the pad through wireless power transmission and at least one CE device to attach to the pad through a wired connection. The wired connection could be in the form of a charging cradle where the device just needs to be set in the cradle to establish a physical wired connection.

Further, in some embodiments the CE device includes a housing or a wireless power transfer casing, clip or the like is cooperated with the CE device, and the housing or casing comprise a wireless power transfer antenna, which may be configured to allow the distance between power transfer antennas to be minimized and thus increasing the transmission efficiency. Further, a CE device having a built-in wireless power transfer antenna may be configured to recognize that it is cooperated with a wireless power transfer casing such that the CE device switches to using the power transfer antenna in the casing when placed in a case with a wireless power transfer antenna. Again, the casing may include alignment component that reduce the distance and/or enhance positioning and/or alignment of the power transfer antennas of wirelessly cooperated CE devices.

In some embodiments, a wireless power transfer antenna is configured to be external to a CE device and to plug into a connector of the CE device. As such, the power transfer antenna does not have to be built into the CE device, while still providing the wirelessly power transfer capability. In many embodiments, the power transfer antennas are positioned proximate to and in some instances located on or near the surface of a housing of the CE device, power transfer casing or other device. This can improve wireless power transfer efficiency, including when charging from a more traditional wireless power source. In some embodiments, CE devices are configured with an internal antenna that can be turned off when using an external power transfer antenna (e.g., an antennae in a power transfer casing) or the CE device may not have an internal antenna and would only have the ability to send or receive wireless power when coupled with an external antenna (e.g., a stand-alone external power transfer antenna, a power transfer antenna in a power transfer casing, etc.).

Some embodiments further include and/or utilize one or more solar panels that can be used to charge a battery and/or power from the solar panel can be wirelessly distributed to one or more other CE devices. In a lot of situations, such as a long hiking trip or day at the beach, people are away from a power source to charge their CE devices, but they are in a sunny location. This is especially true for rural areas and developing countries. In some embodiments, the CE devices are configured with a housing or casing that includes one or more solar panels and/or cooperate with a casing that includes one or more solar panels (and may include separate storage capacity). Accordingly the CE device can charge its battery, or at least provide partial power which can reduce the rate at which the CE device drains its battery. The CE device or separate casing can further include and/or utilize charge circuitry 316 to allow trickle charging from the slow source of power from the solar cell(s). In some embodiments, the CE device or external casing includes one or more pull-outs, fold-outs or flaps that allow for greater numbers of panels and/or solar cells when the pull-outs or flaps are extended. In some implementations, the CE device housing and/or the casing are configured so that when solar panels are folded up, one of the surfaces is exposed, or an additional solar panel is on the back of the outside flap so that the case still can provide some power.

A battery within a casing can be charged from the solar panels and available to the CE device, and/or transferred to a battery of the CE device. In some embodiments, the CE device includes an emergency mode that reduces the battery usage by only powering the minimum necessary to enable communications. Further, in some embodiments a casing with at least one solar cell is configured to removably receive one or more batteries of the type that powers the CE device such that batteries can be swapped between the CE device and the casing. The casing is configured to charge the received one or more batteries from its one or more solar cells. In some implementations, the CE device may be configured to draw a power from both internal battery and a battery of the casing. For example, when batteries in the CE device and the casing are getting too low to individually run the CE device, the CE device might be able to draw a small amount of power from both batteries simultaneously to allow it to operate for a bit longer.

While the invention herein disclosed has been described by means of specific embodiments, examples and applications thereof, numerous modifications and variations could be made thereto by those skilled in the art without departing from the scope of the invention set forth in the claims.

What is claimed is:

1. A portable consumer electronic device, comprising:
   a battery;
   a user interface configured to provide a user with information and receive inputs from a user; and
   a wireless power distribution circuitry coupled with the battery, wherein the wireless power distribution circuitry comprises:
      a power transfer antenna electrically coupled with the battery and configured to wirelessly and inductively couple with a separate second portable consumer electronic device that is configured to wirelessly and inductively couple with the portable consumer electronic device, and the wireless power distribution circuitry is configured to wirelessly transfer power from the battery through the power transfer antenna to the second portable consumer electronic device;
      a power supply controller configured to control the wireless transfer of power through the power transfer antenna; and
      a charge circuitry coupled with the power transfer antenna, wherein the charge circuitry is configured to wirelessly receive electrical power through the power transfer antenna and from a separate third portable consumer electronic device, wherein the charge circuitry comprises local power storage circuitry configured to store the received electrical power received from the third portable consumer electronic device, and to discharge the electrical power from the local power storage circuitry to the battery when a power level of the local power storage circuitry exceeds a first threshold directing the wirelessly received electrical power to the battery to be stored.

2. The portable consumer electronic device of claim 1, further comprising:
   a transceiver configured to provide bidirectional communication with the second portable consumer electronic device.

3. The portable consumer electronic device of claim 2, further comprising:
   a serial antenna coupled with the transceiver, wherein the serial antenna is separate from the power transfer antenna, and wherein the transceiver transmits data to the second portable consumer electronic device through the serial antenna.

4. The portable consumer electronic device of claim 3, wherein the serial antenna is concentric with the power transfer antenna.

5. The portable consumer electronic device of claim 2, wherein the transceiver couples with the power transfer antenna and is configured to modulate data transmitted through the power transfer antenna to the second portable consumer electronic device.

6. The portable consumer electronic device of claim 2, wherein the transceiver is configured to receive modulate data transmitted through the power transfer antenna from the second portable consumer electronic device.

7. The portable consumer electronic device of claim 2, wherein the transceiver couples with the power transfer antenna and is configured to receive data through the power transfer antenna transmitted from the second portable consumer electronic device.

8. The portable consumer electronic device of claim 1, further comprising:
   a housing, wherein the user interface is incorporated with the housing and at least partially visible and accessible to the user from an exterior of the housing; and
   wherein the wireless power distribution circuitry is detachable from the housing.

9. The consumer electronic device of claim 8, wherein the wireless power distribution circuitry further comprises an external connector configured to receive a cable through which power is received, wherein the power received through the external connector is at least partially directed to the battery.

10. The consumer electronic device of claim 8, wherein the wireless power distribution circuitry further comprises a second battery.

11. The consumer electronic device of claim 1, further comprising:
   a controller configured to at least authenticate the second consumer electronic device prior to authorizing the wireless transfer of power to the second consumer electronic device and control an amount of power wirelessly transferred to the second consumer electronic device.

12. The consumer electronic device of claim 1, wherein the charge circuitry is configured to accumulate over a period of time the electrical power received from the power transfer antenna until the power exceeds the first threshold.

13. The consumer electronic device of claim 12, wherein the electrical power received over the period of time through the power transfer antenna is less than the first threshold.

14. The consumer electronic device of claim 1, wherein the charge circuitry in releasing the power is configured to release the power to provide the electrical power to the battery at a power level that is consistent with a second threshold.

15. The consumer electronic device of claim 14, wherein the second threshold is consistent with a power level that is received through an external input power source that is physically coupled with the portable consumer electronic device via a wire line.

16. A method of wirelessly transferring power, the method comprising:
   wirelessly and inductively coupling a power transfer antenna of a wireless power distribution circuitry of a first portable consumer electronic device with a separate second portable consumer electronic device that is configured to wirelessly and inductively couple with the power transfer antenna, wherein the first portable consumer electronic device comprises a battery and a user interface that is configured to provide a user with information and receive inputs from a user;
   wirelessly transferring power from the battery of the first portable consumer electronic device through the power transfer antenna to the second portable consumer electronic device;
   wirelessly receiving electrical power through the power transfer antenna and from a separate third portable consumer electronic device;
   locally storing in a local power storage circuitry the received electrical power received from the third portable consumer electronic device; and
   discharging the electrical power from the local power storage circuitry to the battery when a power level of the local power storage circuitry exceeds a first threshold and directing the wirelessly received electrical power to the battery to be stored.

\* \* \* \* \*